US009222601B2

(12) United States Patent
Fischer

(10) Patent No.: US 9,222,601 B2
(45) Date of Patent: Dec. 29, 2015

(54) PROCESSING MACHINES FOR WORKPIECE PROCESSING

(71) Applicant: TRUMPF Laser-und Systemtechnik GmbH, Ditzingen (DE)

(72) Inventor: Gunter Fischer, Moensheim (DE)

(73) Assignee: Trumpf Laser- Und Systemtechnik GmbH, Ditzingen (DE)

( * ) Notice: Subject to any disclaimer, the term of this patent is extended or adjusted under 35 U.S.C. 154(b) by 0 days.

(21) Appl. No.: 14/574,490

(22) Filed: Dec. 18, 2014

(65) Prior Publication Data
US 2015/0176724 A1 Jun. 25, 2015

(30) Foreign Application Priority Data

Dec. 20, 2013 (DE) .......................... 10 2013 226 954

(51) Int. Cl.
*F16G 5/20* (2006.01)
*F16L 3/015* (2006.01)
*F16G 13/16* (2006.01)
*H02G 11/00* (2006.01)
*H02G 1/00* (2006.01)

(52) U.S. Cl.
CPC . *F16L 3/015* (2013.01); *F16G 5/20* (2013.01); *F16G 13/16* (2013.01); *H02G 1/00* (2013.01); *H02G 11/00* (2013.01)

(58) Field of Classification Search
CPC ........... F16G 13/16; F16G 5/20; H02G 11/00; H02G 1/00; F16L 3/015
See application file for complete search history.

(56) References Cited

U.S. PATENT DOCUMENTS

| 5,178,247 A | * | 1/1993 | Vagaggini | 191/12 C |
| 5,692,984 A | | 12/1997 | Kayatani et al. | |
| 6,119,836 A | * | 9/2000 | Blase | 191/12 C |

FOREIGN PATENT DOCUMENTS

| DE | 1574369 | 8/1971 |
| DE | 10352461 | 6/2005 |
| KR | 1020080034071 A | 4/2008 |

* cited by examiner

*Primary Examiner* — David B Jones
(74) *Attorney, Agent, or Firm* — Fish & Richardson P.C.

(57) ABSTRACT

A processing machine for workpiece processing has a sliding member which can be moved relative to a machine body along a travel channel from a first position into a second position and vice versa. The sliding member is connected to the machine body by at least one energy guiding chain that is at least partially disposed within the travel channel. The energy guiding chain has a plurality of chain members coupled in a flexible manner and the chain members have edge projections supported on shoulders on either side of the travel channel.

17 Claims, 2 Drawing Sheets

PROCESSING MACHINES FOR WORKPIECE PROCESSING

CROSS REFERENCE TO RELATED APPLICATION

This application claims priority under 35 U.S.C. §119(a) to German Application No. DE 10 2013 226 954.4, filed on Dec. 20, 2013, the entire contents of which are hereby incorporated by reference.

TECHNICAL FIELD

The invention relates to a processing machine for workpiece processing, particularly one having a sliding member movable relative to a machine body along a travel channel.

BACKGROUND

In order to supply a processing head and/or a workpiece with energy (for example, compressed air, laser radiation, electric power, cooling water, etcetera), there are typically provided so-called energy guiding chains (also called energy chains or drag chains) which are secured at one end to the machine body and at the other end to the sliding member and in which flexible supply lines for transmitting the energy are guided.

The energy guiding chains can be at least partially received or disposed within the travel channel in order to carry out the travel movement of the sliding member, which channel is formed, for example, in the floor or in the foundation below the processing machine (so-called underfloor channel). Regardless of whether an energy guiding chain is disposed within such a travel channel or not, such channels may, however, constitute a tripping hazard or at least an obstacle for workers or vehicles moving in the region of the processing machine during movement or travel. Furthermore, in the event that, during the workpiece processing operation, for example, laser radiation which is highly energetic and which is consequently harmful to humans is used, the laser radiation (or other emissions occurring during the workpiece processing operation) can be discharged via the underfloor channel even when a protective cabin is provided.

SUMMARY

One aspect of the invention features a processing machine for workpiece processing. The processing machine includes a machine body defining a travel channel and a sliding member which can be moved relative to the machine body along the travel channel from a first position into a second position and vice versa. The sliding member is connected to the machine body by at least a first energy guiding chain, which has a plurality of chain members coupled in a flexible manner and can be at least partially disposed within the travel channel. The chain members have edge projections supported on shoulders on either side of the travel channel.

The edge projections can protrude beyond a central region of the chain members so that, in the state disposed within the travel channel, the edge positions can be positioned on the shoulders of the travel channel and in this manner the edge projections advantageously cover the travel channel in such a manner that, on one hand, no emissions, such as, for example, laser radiation can be discharged outwards from the inner side of the travel channel and, on the other hand, it is readily possible to walk or travel on the travel channel over the disposed chain members. By the edge projections being positioned on the travel channel shoulders, the chain members act as floor-flush covering elements for the travel channel.

Various examples of the processing machine are thus configured such that the danger of discharge of emissions, in particular the danger of discharge of laser radiation, and/or the risk of tripping, is reduced and the ability to walk or travel over the travel channel is improved. The portion of the energy guiding chain disposed within the travel channel forms the so-called lower strand of the energy guiding chain. The portion of the energy guiding chain, which portion is larger or smaller depending on the current position of the sliding member and projects out of the travel channel, accordingly forms the upper strand. Supply lines which are also constructed in a flexible manner are guided in the energy guiding chain. The sliding member may be supplied by means of the supply lines, for example, with compressed air, laser radiation, electric power, cooling water, etcetera. The chain members are preferably produced from plastics material, the hardness and nature of the plastics material being able to be adapted to the loading which may occur depending on the intended application (for example, depending on the anticipated weight loading when the chain members are travelled over).

In some embodiments, the edge projections have chamfers which decline in a planar manner in the direction towards the edge in order to make them even easier to walk or travel over. The travel channel can have, in order to receive or deposit the chain members, a cross-section shape which is open at one side and adapted to the cross-section shape of the chain members. The processing machine, in particular the machine body and a processing head which is arranged thereon, is generally positioned on a foundation or floor, in which the travel channel is embedded or introduced. Components of the machine body may optionally also be arranged below the floor, that is to say, below the foundation or floor upper side. The processing machine may, for example, be a laser processing machine, in particular having a solid-state laser of the laser wavelengths ≤1064 nm. In one embodiment, with the exception of the first and last (machine-body-side and sliding-member-side) chain member, all the chain members are constructed in a similar or identical manner. In other embodiments, the chain members are constructed so as to be partially similar or identical.

In a preferred embodiment of the processing machine, the chain members each have two side walls which are offset with respect to each other in the transverse direction of the chain and which are spaced from adjacent side walls of the travel channel and adapted to the flank shape (or the side wall shape) of the travel channel, the edge projections protruding for support on the shoulders of the travel channel (in the transverse direction of the chain) beyond the side walls of the chain members. The energy guiding chain is introduced during a depositing operation brought about by the sliding member movement independently (automatically) and in a uniform manner into the travel channel. In this instance, a continuously increasing number of chain members are gradually disposed within the travel channel. Accordingly, in a reverse sequence, that is to say, in the event of a movement of the sliding member which is carried out in the opposite direction, the chain members can be increasingly lifted from the travel channel. The shape of the side walls which is adapted to the travel channel flanks can in this instance function in a centering and consequently additionally supportive manner. The edge projections protrude in particular in the transverse direction of the chain, that is to say, in the direction of the travel channel width, in an outward direction beyond the side walls. The side walls are thereby adapted to the flank shape of the travel channel in such a manner that they substantially follow the cross-section shape of the travel channel in the region of the travel channel flanks Typically, the side walls are inwardly offset by a small amount with respect to the lateral (inner) flanks of the travel channel so that, in the state of the respective chain member or the energy guiding chain disposed within the travel channel, a uniform gap is produced between the respective side wall and the correspondingly facing travel channel flank. The gap enables unimpeded relative movement between the chain members and the travel channel during the depositing or lifting operation.

In a preferred development of the previous embodiment, the edge projection width is greater than the sum of the gaps formed between the travel channel inner flanks (or the side walls of the travel channel) and the side walls or greater than the sum of the gaps and a shoulder radius of the travel channel. Particularly secure covering of the travel channel at the same time with good ability for walking or travelling over it is thereby produced. The edge projection width is quite particularly preferably from 1 to 10 mm greater than the sum of the previously mentioned gaps or from 1 to 10 mm greater than the sum of the gaps and the shoulder radius. The shoulder radius is intended to be understood to be the radius of the typically round transition from the travel channel shoulders to the travel channel inner flanks In another development, the chain members each have a ceiling wall whose lateral edges form the edge projections, the ceiling wall and the side walls being integrally formed one on the other. The integral (that is to say, monolithic) construction increases the stability of the individual chain members and results in a comparatively small chain member weight. This in turn advantageously enables rapid sliding member travel speeds. The integral nature of the chain members can in particular be achieved by the production of the mentioned components with the injection-molding method.

In an alternative development, the chain members each have a ceiling wall, on which the side walls are integrally formed, the edge projections being formed by opposing lateral end portions of a chain member plate which is secured to the ceiling wall. In this manner, different chain member plates with plate thicknesses which vary in each case can be secured to the ceiling wall in order to adapt to loads of different magnitudes when travelling over the energy guiding chain (for example, by means of weight loads of different magnitudes when the chain members are travelled over). Each chain member typically comprises a chain member plate, the corresponding chain member plate being able to be secured to the ceiling wall, for example, by means of a catch means or a screw connection.

A development is also preferred in which the ceiling wall, the side walls and a base wall form a hollow profile-member with a rectangular cross-section for internal guiding of supply lines in the energy guiding chain. Owing to the hollow profile-member with a rectangular cross-section, the supply lines which are guided internally therein are protected in an optimum manner from machine-side emissions, such as, for example, energy-rich laser radiation, but also from other external influences such as, for example, falling objects. The hollow profile structure further ensures that the individual chain members are held together in a particularly stable manner.

In an embodiment of the processing machine, edge portions of chain members which are arranged beside each other overlap in the longitudinal direction of the chain, which edge portions extend in the longitudinal direction of the chain. In this manner, there are no gaps between adjacent chain members through which emissions, such as, for example, laser radiation from inside the chain members could be discharged outwards or from one side of the chain members to the other side of the chain members. The covering of the travel channel is consequently further improved. The edge portions which extend in the longitudinal direction of the chain may, for example, be formed by portions of the ceiling wall extending in the longitudinal direction of the chain or by corresponding portions of the chain member plate. The overlapping edge portions are in this instance constructed so as to be so long that the overlap which brings about the protection is retained in each pivot position of the adjacent chain members. In this instance, a front-side edge portion of one chain member may be constructed to be slightly stepped in order to extend to some degree in a manner introduced below the rear-side edge portion of the chain member which is arranged in an adjacent manner. In a specific embodiment, the edge portions of chain members which are arranged beside each other have flexible seals, which portions extend in the longitudinal direction of the chain. Owing to these seals which are constructed in a flexible manner, it is further ensured that, during the relative movement of the individual chain members with respect to each other, in particular when the individual chain members form an angle with respect to each other, neither radiation nor contamination can be introduced into the chain members or be discharged from them.

An embodiment is also preferred in which the travel channel is at least as deep as the chain member height, in particular at least as deep as the side wall height, and/or in which the travel channel is at least as wide as the chain member width, in particular at least as wide as the transverse displacement of the side walls. The support of the edge projections on the shoulders of the travel channel is carried out, for example, in a suspended manner, that is to say, the chain members are retained in the travel channel in a suspended manner so that, owing to the inherent weight of the energy guiding chain, there is always produced on the shoulders of the travel channel a support pressure which ensures particularly tight support of the travel channel and consequently increased sealing and consequently operational safety. Alternatively, the chain members may also be positioned on the base of the travel channel. A combination of the two possibilities is also conceivable. When the travel channel is at least as wide as the transverse displacement of the side walls, that is to say, the outer dimension from the outer side of a first side wall to the outer side of the other second side wall, then an unimpeded relative movement of the chain members with respect to the travel channel is possible, in particular the travel channel inner flanks The first position of the sliding member is preferably in a loading and/or unloading region and the second position is in a processing region which is separated therefrom by means of a protection wall. The sliding member, after being loaded with the workpiece to be processed, can consequently be moved from the loading region along the travel channel into the processing region in order to be processed at that location, for example, by means of a laser beam. If, after assuming the processing position, a protection wall is arranged or pivoted between the loading and unloading region and the processing region, no laser radiation and no other emissions which occur during the workpiece processing operation in the processing region can be discharged through the travel channel past the protection wall outwards into the loading and unloading region since the travel channel is covered by the chain members which are positioned above the edge projections in a manner impermeable with respect to light.

Finally, there is preferred an embodiment of the processing machine having another second energy guiding chain which is connected to the machine body and the sliding member and which can be disposed at least partially within the travel channel, the first energy guiding chain being secured in the travel channel longitudinal direction to one sliding member side and the second energy guiding chain being secured to the other opposing sliding member side. The sliding member which is guided in the travel channel, for example, by means of rollers, covers the travel channel at the respective travel position thereof so that the travel channel can be completely covered irrespective of the current travel position by the sliding member and the energy guiding chains which are disposed at least partially within the travel channel, and consequently no processing emissions, in particular no laser radiation, can be introduced into the loading and unloading region through the travel channel. In the chain members, in particular in the hollow profile-members of the chain members, the flexible supply lines are guided (in both energy guiding chains). The second energy guiding chain also has a plurality of flexibly coupled chain members with edge projections for suspended support on the travel channel shoulders.

Other advantages and advantageous embodiments of the subject-matter of the invention will be appreciated from the description, the claims and the drawings. The features mentioned above and those set out below may also be used individually per se or together in any combination. The embodiments shown and described are not intended to be understood to be a conclusive listing but are instead of exemplary character for describing the invention. The Figures of the drawings show the subject-matter according to the invention in a highly schematic manner and are not intended to be understood to be to scale.

DETAILED DESCRIPTION

Figure 1:
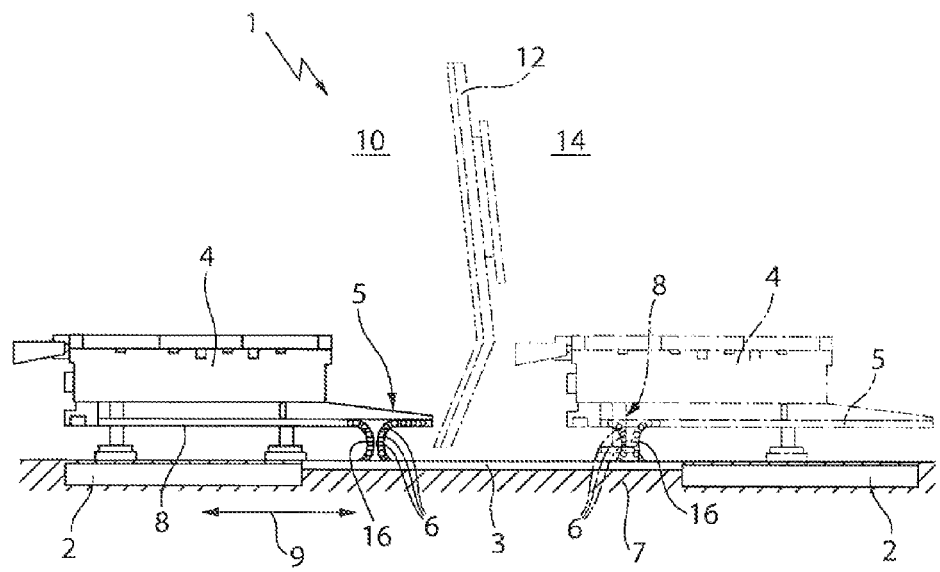
FIG. 1 is a side view of a processing machine.

FIG. 1 shows a processing machine 1 for workpiece processing (or a workpiece processing machine) which comprises a machine body 2, a travel channel 3 and a sliding member 4 which can be moved relative to the machine body 2 along the travel channel 3 from a first position into a second position and vice versa. The sliding member 4 is connected to the machine body 2 by means of a first energy guiding chain 5 which has a plurality of chain members 6 connected to each other in a flexible manner. The first energy guiding chain 5 can be disposed at least partially within the travel channel 3 (depending on the current location or position of the sliding member 4, larger or smaller portions of the energy guiding chain 5 are disposed within the travel channel 3). The sliding member 4, for moving from the first position into the second position or vice versa, may, for example, have rollers which are typically guided in the travel channel 3 or over the travel channel 3 (for example, on shoulders of the travel channel). The travel channel 3 and the machine body 2 which comprises in FIG. 1 a left-hand and a right-hand portion are introduced into a foundation 7 or into the floor. Of course, the machine body 2 may also be constructed in an integral manner and/or may not be introduced into the floor 7 but is instead arranged, for example, in an upright manner on the floor 7. The processing machine 1 further comprises another second energy guiding chain 8 which is connected to the machine body 2 and the sliding member 4 and which can also be disposed at least partially within the travel channel 3. The first energy guiding chain 5 is secured in the longitudinal direction 9 of the travel channel to the right-hand sliding member side in FIG. 1 and the second energy guiding chain 8 is secured to the opposing left-hand sliding member side. There are received in the energy guiding chains 5, 8 (cf. for example, FIG. 5) flexible supply lines which extend in the longitudinal direction 9 of the chain and by means of which the sliding member 4, to which a workpiece for processing can generally be secured or clamped, can be supplied, for example, with compressed air, cooling water or electrical power, etcetera. It is also possible to supply the drive means required for the movement of the sliding member with electrical power by means of the energy guiding chains 5, 8.

The first position of the sliding member 4 is arranged in a loading region or an unloading region 10 and the second position is arranged in a processing region 14 which is separated therefrom by means of a protection wall 12 (dashed line illustration of the sliding member 4). The sliding member 4 may, for example, be provided in the loading region 12 with a workpiece which is secured to the sliding member 4 and subsequently be moved into the processing region 14. The processing region 14 is typically delimited or completely surrounded by a protection cabin (not illustrated) which can be opened in order to move the sliding member 4 in or out by moving, displacing or pivoting the protection wall 12. As described in greater detail below with reference to FIG. 3 and FIGS. 4a, 4b, edge projections 16 are formed at both sides on the chain members 6.

Figure 2:
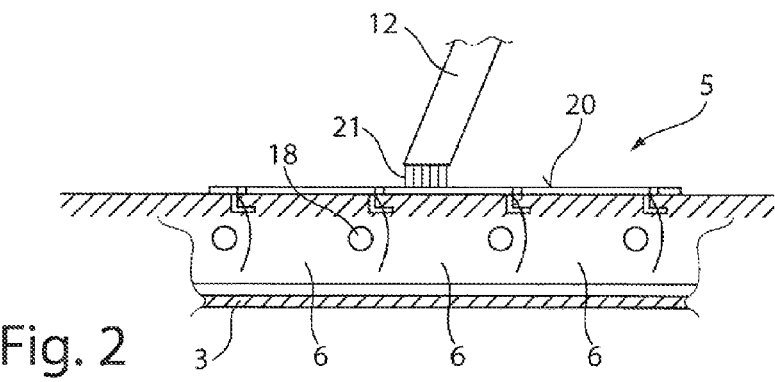
FIG. 2 is an enlarged cut-out of FIG. 1.

FIG. 2 shows in an enlarged and more detailed manner a cut-out of FIG. 1. Three complete chain members 6 of an energy guiding chain 5 which is disposed within the region of the protection wall 12 in the travel channel 3 are illustrated therein, articulation means 18 for coupling adjacent chain members 6 being visible. The gap which is produced between the upper side 20 of the chain members and the lower side of the protection wall 12 is closed in a manner impermeable with respect to light by shielding means, such as the brushes 21 illustrated. Of course, alternatively or in addition, a gas-tight closure of this gap is also possible, for example, by means of a corresponding rubber seal (not illustrated).

Figure 3:
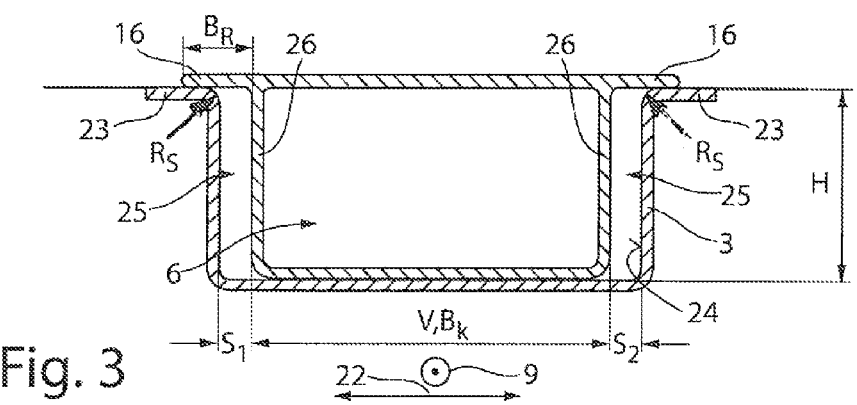
FIG. 3 is a cross-section through a travel channel and an energy guiding chain of the processing machine according to FIGS. 1 and 2.

FIG. 3 shows a cross-section in the chain or travel channel transverse direction 22 through a chain member 6 which is disposed within the travel channel 3. Both the chain members 6 of the first and the chain members 6 of the second energy guiding chain 5, 8 each have edge projections 16 for support on the shoulders 23 of the travel channel 3. In the state of the chain member 6 disposed within the travel channel 3, the lateral edge projections 16 are each positioned on one of the opposing shoulders 23. Consequently, the travel channel 3 is covered in the region of the respective chain member 6 by means of the corresponding chain member length (chain member length in the longitudinal direction 9 of the chain) from one shoulder to the other opposing shoulder 23 in the travel channel transverse direction 22. The advantage of the edge projections 16 of the chain members 6 is that they completely cover the gaps 25 between the travel channel inner flanks 24 and the chain members 6 and consequently no emissions, such as, for example, laser radiation, can be discharged from inside the travel channel 3 in an outward direction.

The chain members 6 each have two side walls 26 which are offset relative to each other in the transverse direction 22 of the chain and which are adapted to the flank shape of the travel channel 3. The edge projections 16 protrude for support on the shoulders 23 of the travel channel 3 beyond the side walls 26. In this instance, the edge projection width BR is greater than the sum of the gaps S1, S2 and a shoulder radius RS of the travel channel 3. The travel channel 3 is at least as deep as the chain member height H and at least as wide as the chain member width BK. That is to say: the travel channel 3 is at least as deep as the side wall height and at least as wide as the transverse displacement V of the side walls 26.

Figures 4A, 4B:
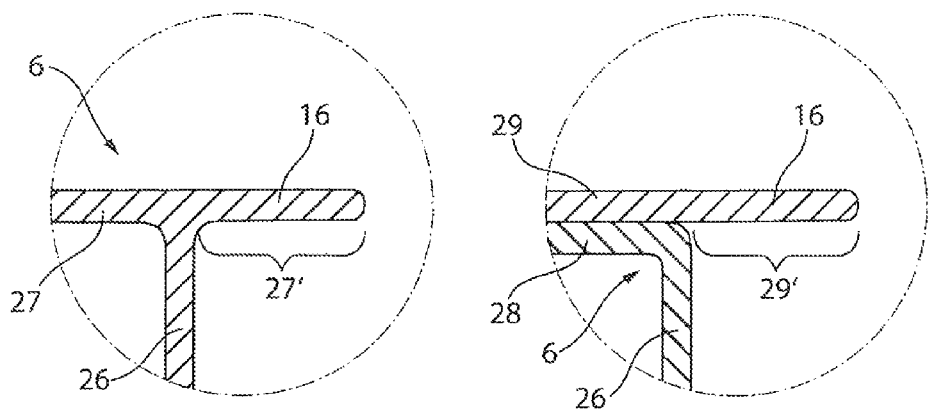
FIGS. 4a, 4b show different embodiments of chain members of an energy guiding chain.

FIG. 4a is a cut-out of the region of an edge projection 16 of a chain member 6 according to a first embodiment of the processing machine 1, which embodiment corresponds to FIG. 3 and in which the chain members 6 each have a ceiling wall 27 whose lateral edges 27' form the edge projections 16, the ceiling wall 27 and the side walls 26 being formed integrally on each other.

FIG. 4b shows an alternative embodiment in which the chain members 6 each have a ceiling wall 28 on which the side walls 26 are integrally formed, the edge projections 16 of the chain member 6 being formed by means of the lateral end portions 29' of a chain member plate 29 which is secured to the ceiling wall 28.

Figure 5:
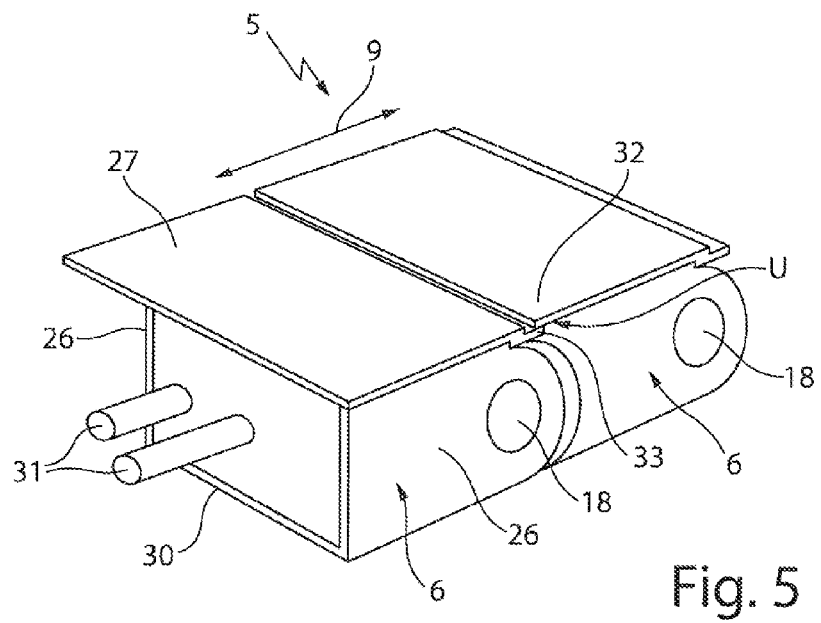
FIG. 5 is a perspective view of two adjacent chain members of an energy guiding chain.

Finally, FIG. 5 is a perspective view of two adjacent chain members 6 which are flexibly coupled to each other by means of the articulation means 18. The ceiling wall 27, the side walls 26 and a base wall 30 each form a hollow profile-member with a rectangular cross-section for internally guiding supply lines 31 in the energy guiding chain 5. In FIG. 5, only two supply lines 31 are illustrated by way of example but it is self-evident that typically a greater number of supply lines 31 (depending on the corresponding application) can be guided through the hollow profile-member.

The edge portions 32, 33 of chain members 6 which are arranged beside each other overlap in the longitudinal direction 9 of the chain, which portions extend in the longitudinal direction 9 of the chain. In this manner, no gap which extends in the longitudinal direction 9 of the chain is produced between adjacent chain members 6. The covering of the travel channel 3 thus also has no gaps in the longitudinal direction 9 of the chain or travel groove so that, in this instance, no emissions, such as, for example, laser radiation, can also reach the outer side from the inner side.

In order to ensure the overlap (in particular in any pivoted position of the adjacent chain members 6), the edge portions 32, 33 of the chain members 6 which bring about the overlap U are sufficiently long and constructed so as to protrude in the longitudinal direction 9 of the chain. In this instance, one chain member 6 has the edge portion 32 which protrudes at the rear side in the longitudinal direction 9 of the chain and the other chain member 6 has the complementary edge portion 33 which is stepped slightly in a downward direction (cf. also FIG. 2). With the exception of the first and last machine-member-side and sliding-member-side chain members 6, all the chain members 6 are typically constructed in an identical manner.

A number of embodiments of the invention have been described. Nevertheless, it will be understood that various modifications may be made without departing from the spirit and scope of the invention. Accordingly, other embodiments are within the scope of the following claims.

What is claimed is:

1. A processing machine for workpiece processing, comprising:
   a machine body defining a travel channel; and
   a sliding member movable relative to the machine body along the travel channel between a first position and a second position,
   wherein the sliding member is connected to the machine body by at least a first energy guiding chain that is at least partially disposed within the travel channel,
   wherein the travel channel comprises shoulders on both sides of the travel channel, and the first energy guiding chain comprises a plurality of chain members coupled in a flexible manner, the chain members having edge projections supported on the shoulders of the travel channel, and
   wherein edge portions of adjacent chain members overlap in a longitudinal direction of the first energy guiding chain, the edge portions extending in the longitudinal direction.

2. The processing machine of claim 1, wherein the travel channel comprises two side walls on the sides, and the chain members each have two side walls that are offset relative to each other in a transverse direction of the first energy guiding chain and spaced from the adjacent side walls of the travel channel, and
   wherein the edge projections of the chain members protrude for support on the shoulders beyond the side walls of the chain members.

3. The processing machine of claim 2, wherein a first gap is formed between a first side wall of the travel channel and an adjacent first side wall of one of the chain members, and a second gap is formed between a second side wall of the travel channel and an adjacent second side wall of the one of the chain members, and
   wherein a width of the edge projections is greater than a sum of the first gap and the second gap.

4. The processing machine of claim 3, wherein the width of the edge projections is from 1 to 10 mm greater than the sum of the gaps.

5. The processing machine of claim 2, wherein a width of the edge projections is greater than a sum of gaps formed between the side walls of the travel channel and the side walls of the chain members and a shoulder radius of the travel channel, the shoulder radius being a radius of a round transition from the shoulders to the side walls of the travel channel.

6. The processing machine of claim 2, wherein the chain members each have a ceiling wall that comprises lateral edges configured to form the edge projections, the ceiling wall and the side walls being integrally formed with each other.

7. The processing machine of claim 6, wherein the chain members each have a base wall, and wherein the ceiling wall, the side walls and the base wall form a hollow profile-member with a rectangular cross-section for internal guiding of supply lines in the first energy guiding chain.

8. The processing machine of claim 2, wherein the chain members each have a chain member plate and a ceiling wall, the side walls being integrally formed on the ceiling wall, the edge projections being formed by opposing lateral end portions of the chain member plate secured to the ceiling wall.

9. The processing machine of claim 8, wherein the chain members each have a base wall, and wherein the ceiling wall, the side walls and the base wall form a hollow profile-member with a rectangular cross-section for internal guiding of supply lines in the energy guiding chain.

10. The processing machine of claim 2, wherein a width defined by the adjacent side walls of the travel channel is at least as wide as a width defined from a first outer side of a first side wall of one of the chain members to a second outer side of a second side wall of the one of the chain members.

11. The processing machine of claim 1, wherein the travel channel is at least as wide as an outer dimension of the chain members.

12. The processing machine of claim 1, wherein the edge portions of the chain members have flexible seals.

13. The processing machine of claim 1, wherein the travel channel comprises walls with a first height, and the chain members each comprise walls with a second height, the first height being no less than the second height.

14. The processing machine of claim 13, wherein the chain members each have two side walls offset relative to each other in a transverse direction of the first energy guiding chain, the second height being a height of the side walls.

15. A processing machine for workpiece processing, comprising:
- a machine body defining a travel channel;
- a sliding member movable relative to the machine body along the travel channel between a first position and a second position, wherein the first position is within a loading and/or unloading region of the processing machine, and the second position is within a processing region;
- a protection wall separating the processing region from the loading and/or unloading region; and
- a barrier within a gap between one or more chain members and the protection wall,
- wherein the sliding member is connected to the machine body by at least a first energy guiding chain that is at least partially disposed within the travel channel, and
- wherein the travel channel comprises shoulders on both sides of the travel channel, and the first energy guiding chain comprises a plurality of chain members coupled in a flexible manner, the chain members having edge projections supported on the shoulders of the travel channel.

16. The processing machine of claim 15, wherein the barrier comprises a brush or a rubber seal.

17. A processing machine for workpiece processing, comprising:
- a machine body defining a travel channel;
- a sliding member movable relative to the machine body along the travel channel between a first position and a second position,
- a first energy guiding chain connected to the machine body and the sliding member and disposed at least partially within the travel channel, and
- a second energy guiding chain connected to the machine body and the sliding member and disposed at least partially within the travel channel,
- wherein the first energy guiding chain is secured to one end of the sliding member in a longitudinal direction of the travel channel, and the second energy guiding chain is secured to an opposite end of the sliding member in the longitudinal direction of the travel channel, and
- wherein the travel channel comprises shoulders on both sides of the travel channel, and the first energy guiding chain comprises a plurality of chain members coupled in a flexible manner, the chain members having edge projections supported on the shoulders of the travel channel.

* * * * *